United States Patent
Han et al.

(10) Patent No.: US 11,265,486 B2
(45) Date of Patent: Mar. 1, 2022

(54) FOCUS TRACKING SYSTEM AND METHOD

(71) Applicant: Research Institute of Tsinghua University in Shenzhen, Shenzhen (CN)

(72) Inventors: Yuxing Han, Guangdong (CN); Jiangtao Wen, Guangdong (CN); Jisheng Li, Guangdong (CN)

(73) Assignee: Research Institute of Tsinghua University, Shenzhen (CN)

(*) Notice: Subject to any disclaimer, the term of this patent is extended or adjusted under 35 U.S.C. 154(b) by 0 days.

(21) Appl. No.: 17/317,099

(22) Filed: May 11, 2021

(65) Prior Publication Data
US 2021/0377456 A1    Dec. 2, 2021

Related U.S. Application Data

(60) Provisional application No. 63/030,603, filed on May 27, 2020.

(51) Int. Cl.
*H04N 5/235* (2006.01)
*H04N 5/232* (2006.01)
*H04N 5/247* (2006.01)
*H04N 9/64* (2006.01)

(52) U.S. Cl.
CPC ........... *H04N 5/247* (2013.01); *H04N 5/2352* (2013.01); *H04N 5/23212* (2013.01); *H04N 5/232123* (2018.08); *H04N 5/232125* (2018.08); *H04N 9/646* (2013.01)

(58) Field of Classification Search
CPC .. H04N 5/247; H04N 5/2352; H04N 5/23212; H04N 5/232123; H04N 5/232125; H04N 5/23299; H04N 9/646
See application file for complete search history.

(56) References Cited

U.S. PATENT DOCUMENTS

2008/0219654 A1* 9/2008 Border ............. H04N 5/232123
396/89
2018/0191947 A1* 7/2018 Sa .................... H04N 5/232123

* cited by examiner

*Primary Examiner* — Nelson D. Hernández Hernández
(74) *Attorney, Agent, or Firm* — Blueshift IP, LLC; Cynthia Gilbert

(57) ABSTRACT

The present disclosure relates to a focus tracking system and method. The system comprises: a primary camera comprising a first focus adjustable lens and a first focus adjusting servo motor driving the first focus adjustable lens to perform focus adjusting; a secondary camera comprising a second focus adjustable lens and a second focus adjusting servo motor driving the second focus adjustable lens to perform focus adjusting, coded aperture is installed inside the second focus adjustable lens, the secondary and primary camera have equivalent optical parameters; a synchronization system performing frame level synchronization between images of the primary and secondary camera to obtain frame-level synchronized primary and secondary camera images; a focus control system calculating out-of-focus offset utilizing coded patterns of the coded aperture and out-of-focus images in the frame-level synchronized secondary camera images, sending focus adjusting signals to the first and second focus adjusting servo motor based on the out-of-focus offset.

18 Claims, 3 Drawing Sheets

FOCUS TRACKING SYSTEM AND METHOD

CROSS-REFERENCE TO RELATED APPLICATION

The present application claims priority benefits to US Provisional Application No. 63/030,603 filed on May 27, 2020, the contents of which are incorporated herein by reference.

FIELD OF THE INVENTION

The present disclosure relates to the field of camera shooting, in particular to a focus tracking system and method.

BACKGROUND

Ultra-high-definition camera has a relatively narrow depth of field, so that any slight out-of-focus will be more obvious to human eyes. Therefore, a precise focus tracking system is required to make the final captured image clear.

SUMMARY

The purpose of the present disclosure is to provide a focus tracking system and method, which can make the final captured image clear.

According to a first embodiment of the present disclosure, a focus tracking system is provided, the focus tracking system comprises a primary camera, a secondary camera, a synchronization system, and a focus control system, wherein: the primary camera comprises a first focus adjustable lens and a first focus adjusting servo motor, and the first focus adjusting servo motor is configured to drive the first focus adjustable lens to perform focus adjusting; the secondary camera comprises a second focus adjustable lens and a second focus adjusting servo motor, the second focus adjusting servo motor is configured to drive the second focus adjustable lens to perform focus adjusting, a coded aperture is installed inside the second focus adjustable lens, and the secondary camera has optical parameters equivalent to those of the primary camera; the synchronization system is configured to perform frame level synchronization between images captured by the primary camera and the secondary camera to obtain frame-level synchronized primary camera images and frame-level synchronized secondary camera images; and the focus control system is configured to calculate out-of-focus offset by utilizing coded patterns of the coded aperture and out-of-focus images in the frame-level synchronized secondary camera image, and to send focus adjusting signals to the first focus adjusting servo motor and the second focus adjusting servo motor based on the out-of-focus offset.

According to a second embodiment of the present disclosure, a focus tracking method is provided and is applied to a focus tracking system. The Focus tracking system comprises a primary camera, a secondary camera, a synchronization system, and a focus control system, wherein the primary camera comprises a first focus adjustable lens and a first focus adjusting servo motor, and the first focus adjusting servo motor is configured to drive the first focus adjustable lens to perform focus adjusting, and the secondary camera comprises a second focus adjustable lens and a second focus adjusting servo motor, the second focus adjusting servo motor is configured to drive the second focus adjustable lens to perform focus adjusting, a coded aperture is installed inside the second focus adjustable lens, and the secondary camera has optical parameters equivalent to those of the primary camera. The focus tracking method comprises the following steps: performing frame level synchronization between images captured by the primary camera and the secondary camera to obtain frame-level synchronized primary camera images and frame-level synchronized secondary camera images; calculating out-of-focus offset by utilizing the coded patterns of the coded aperture and the out-of-focus image in the frame-level synchronized secondary camera images; and executing focus adjusting of the first focus adjustable lens and the second focus adjustable lens based on the out-of-focus offset.

According to the above technical solution, the synchronization system can perform frame level synchronization between images captured by the primary camera and the secondary camera, the focus control system can calculate out-of-focus offset by utilize the coded patterns of the coded aperture installed inside the second focus adjustable lens and the out-of-focus images in the frame-level synchronized secondary camera images, and can send the focus adjusting signals to the first focus adjusting servo motor and the second focus adjusting servo motor based on the out-of-focus offset, therefore the precise zooming and focus adjusting can be achieved, and the final captured image is clear.

Other features and advantages of the present disclosure will be described in detail in the following specific embodiments.

BRIEF DESCRIPTION OF THE FIGURES

The drawings are used to provide a further understanding of the present disclosure and constitute a part of the description. The drawings are used to explain the present disclosure together with the following specific embodiments, but do not constitute a limitation to the present disclosure. In the drawings.

DETAILED DESCRIPTION OF THE INVENTION

The specific embodiments of the present disclosure are described in detail below with reference to the drawings. It should be understood that the specific embodiments described herein are only used to illustrate and explain the present disclosure, and are not used to limit the present disclosure.

Figure 1:
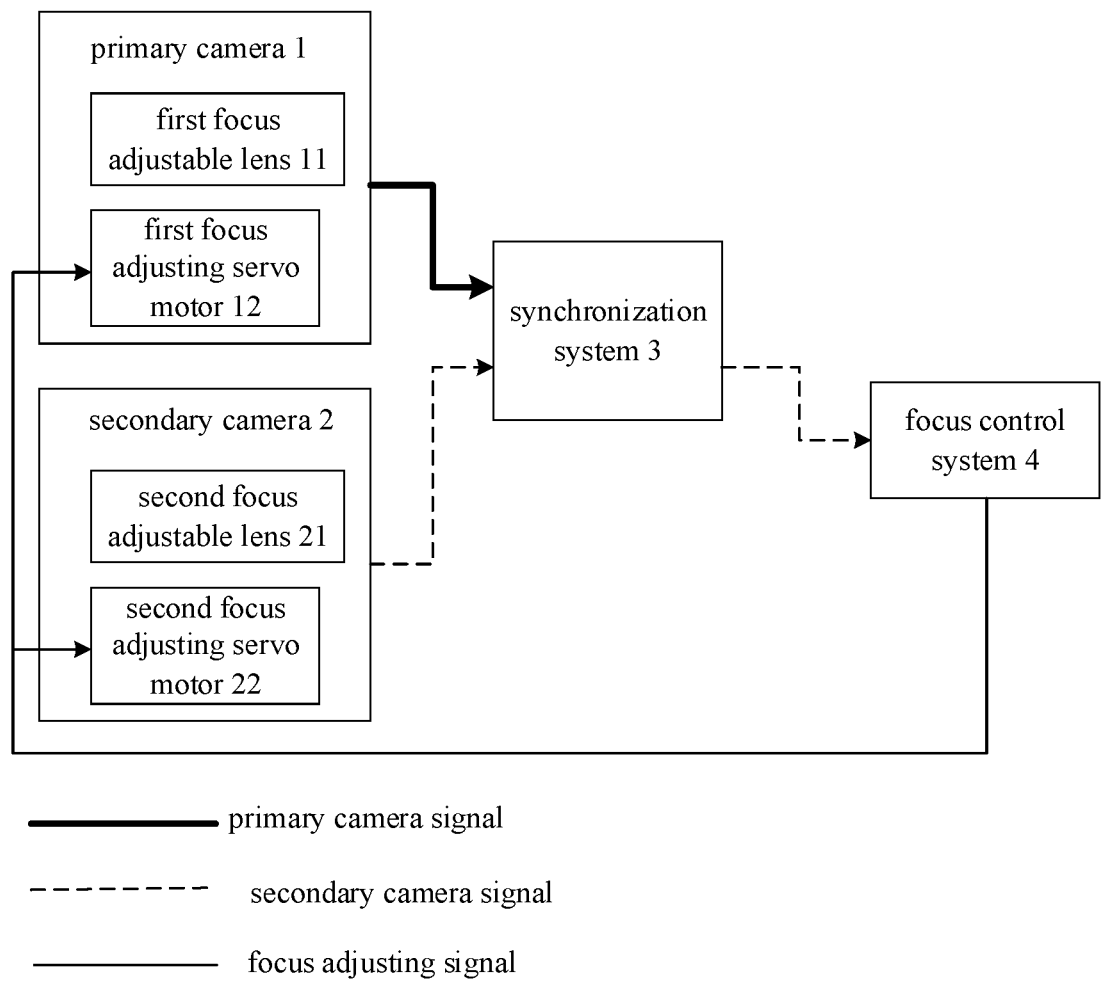
FIG. 1 is a schematic block diagram of a focus tracking system according to an embodiment of the present disclosure.

FIG. 1 is a schematic block diagram of a focus tracking system according to an embodiment of the present disclosure. As shown in FIG. 1, the focus tracking system comprises a primary camera 1, a secondary camera 2, a synchronization system 3, and a focus control system 4.

The primary camera 1 is the main video source of the focus tracking system, and can be an ultra-high-definition camera or other types of cameras. Ultra-high-definition camera has a relatively narrow depth of field. For example, an 8K ultra-high-definition camera has 16 times more pixels compared to a high-definition camera, and thus the pixel size of the ultra-high-definition camera is much smaller; and limited by physical laws, the ultra-high-definition camera will have several times narrower depth of field while using the optical system.

The primary camera 1 comprises a first focus adjustable lens 11 and a first focus adjusting servo motor 12, and the first focus adjusting servo motor 12 is configured to drive the first focus adjustable lens 11 to perform focus adjusting. The first focus adjustable lens 11 can be installed on a camera head of the primary camera 1. The first focus adjustable lens 11 has two focus adjusting modes: manual mode and automatic focus tracking mode. In the manual mode, camera focus can be dialed by an operator or be controlled remotely. When someone adjusting the focus, the first focus adjustable lens 11 performs focus adjusting in the manual mode. In the automatic focus tracking mode, the first focus adjusting servo motor 12 receives a focus adjusting signal from the focus control system 4, and drives the first focus adjustable lens 11 to perform focus adjusting based on the focus adjusting signal.

The primary camera 1 usually outputs video and audio signals captured by the primary camera 1 by using a serial digital interface (SDI) or a high-definition multimedia interface (HDMI).

The secondary camera 2 usually outputs video and audio signals by using a SDI or HDMI interface. The video resolution of the secondary camera 2 can be the same as or lower than that of the primary camera 1.

The secondary camera 2 comprises a second focus adjustable lens 21 and a second focus adjusting servo motor 22, and the second focus adjusting servo motor 22 is configured to drive the second focus adjustable lens 21 to perform focus adjusting. The second focus adjustable lens 21 has two focus adjusting modes: following mode and automatic focus tracking mode, so as to ensure that the second focus adjustable lens 21 always use the same focal length with the first focus adjustable lens 11. If the first focus adjustable lens 11 performs focus adjusting in the manual mode, then the second focus adjustable lens 21 performs focus adjusting in the following mode, that is, the focus control system 4 obtains the focus distance of the first focus adjustable lens 11 from the first focus adjustable lens 11, and then sends the focus distance to the second focus adjusting servo motor 22, and the second focus adjusting servo motor 22 drives the second focus adjustable lens 21 to adjust the focus distance of the second focus adjustable lens 21 to be the same as the focus distance of the first focus adjustable lens 11. If the first focus adjustable lens 11 is in the automatic focus tracking mode, the second focus adjustable lens 21 performs focus adjusting in the automatic focus tracking mode, that is, the second focus adjusting servo motor 22 receives the focus adjusting signal from the focus control system 4, and drives the second focus adjustable lens 21 to perform focus adjusting based on the focus adjusting signal.

As the secondary camera 2 is configured to estimate factors of the primary camera 1 such as the field of view coverage, exposure, and out-of-focus degree, the secondary camera 2 needs to have optical parameter ranges equivalent to that of the primary camera 1, that is, optical parameters at the same level or the same optical parameters, and therefore, if the parameters of the primary camera 1 are adjusted, the secondary camera 2 can be adjusted to have the same parameters by having the optical parameters equivalent to those of the primary camera 1. For example, the dynamic range of the secondary camera 2 should be at the same level with or equivalent to that of the primary camera 1; the second focus adjustable lens 21 and the first focus adjustable lens 11 share the same focus range/aperture range parameters, but not necessarily the same quality; and the secondary camera 2 has the same exposure level as the primary camera 1. In order to achieve the same exposure level, the secondary camera 2 can use ND/eND filters so as to reduce light intensity. The second focus adjustable lens 21 has the same zoom range as the first focus adjustable lens 11; and the shutter speed of the secondary camera 2 will follow the changes in the shutter speed of the primary camera 1.

Coded aperture is installed inside the second focus adjustable lens 21, that is, there is a mask with the coded patterns at the aperture position of the second focus adjustable lens 21. As the coded aperture is installed on the aperture of the second focus adjustable lens 21, the narrowing of the aperture or the half-opening of the aperture will change the imaging of the coded aperture, and therefore, the coded aperture is fixed to be wide open.

In addition, the secondary camera 2 is installed on the primary camera 1 or adjacent to the primary camera 1, and the optical axis of the secondary camera 2 is parallel to the optical axis of the primary camera 1, and the focus plane of the secondary camera 2 is as close as possible to the focus plane of the primary camera 1. If the two focus planes are not on the same plane, the focus offset needs to be calibrated.

The synchronization system 3 is configured to perform frame level synchronization between the images captured by the primary camera and the secondary camera to obtain frame-level synchronized primary camera images and frame-level synchronized secondary camera images. The frame-level synchronization refers to the synchronization of the exposure start time and the exposure end time of each frame when multiple cameras shoot videos. By adopting frame-level synchronization, it can be considered that the images captured by the multiple cameras are images at the same time, that is, the frame synchronization alignment of the images captured by the primary camera and the secondary camera is realized.

The synchronization system 3 can adopt various methods to achieve the above-mentioned frame-level synchronization.

For example, the synchronization system 3 can use a genlock mechanism, a master-slave control mechanism and the like to achieve the above-mentioned frame-level synchronization. The genlock mechanism, the master-slave control mechanism and the like can be built into the primary camera 1 and the secondary camera 2, so that when the primary camera 1 and the secondary camera 2 perform shooting, the frame-level synchronization of the images captured by the primary camera 1 and the secondary camera 2 can be realized.

For another example, the synchronization system 3 can also use a time stamp mechanism, an audio synchronization mechanism and the like to achieve the above-mentioned frame-level synchronization. That is, the synchronization system 3 receives the images captured by the primary camera 1 and the secondary camera 2 respectively from the primary camera 1 and the secondary camera 2, and then realizes the frame-level synchronization between the images captured by the primary camera and the secondary camera by means of time stamp detection, audio synchronization, and the like.

The focus control system 4 is configured to calculate out-of-focus offset by utilizing the coded patterns of the coded aperture and the out-of-focus images in the frame-level synchronized secondary camera images, and to send the focus adjusting signals to the first focus adjusting servo motor 12 and the second focus adjusting servo motor 22 based on the out-of-focus offset.

In some embodiments, the focus control system 4 uses a deconvolutional algorithm to calculate the out-of-focus offset based on the coded patterns of the coded aperture and the out-of-focus images in the frame-level synchronized secondary camera images. That is, as the coded aperture is installed inside the second focus adjustable lens 21, the coded patterns appears on the blurred area of the images captured by the secondary camera 2. When the second focus adjustable lens 21 is installed on the secondary camera 2, the coded patterns are calibrated, and this information is utilized for calculating the out-of-focus offset of the blurred area through a deconvolutional algorithm.

According to the above technical solution, the synchronization system can perform the frame level synchronization between the images captured by the primary camera and the secondary camera, the focus control system can calculate the out-of-focus offset by utilizing the coded patterns of the coded aperture installed inside the second focus adjustable lens and the out-of-focus images in the frame-level synchronized secondary camera images, and can send the focus adjusting signals to the first focus adjusting servo motor and the second focus adjusting servo motor based on the out-of-focus offset, therefore the precise zooming and focus adjusting can be achieved, and the final captured image is clear.

Figure 2:
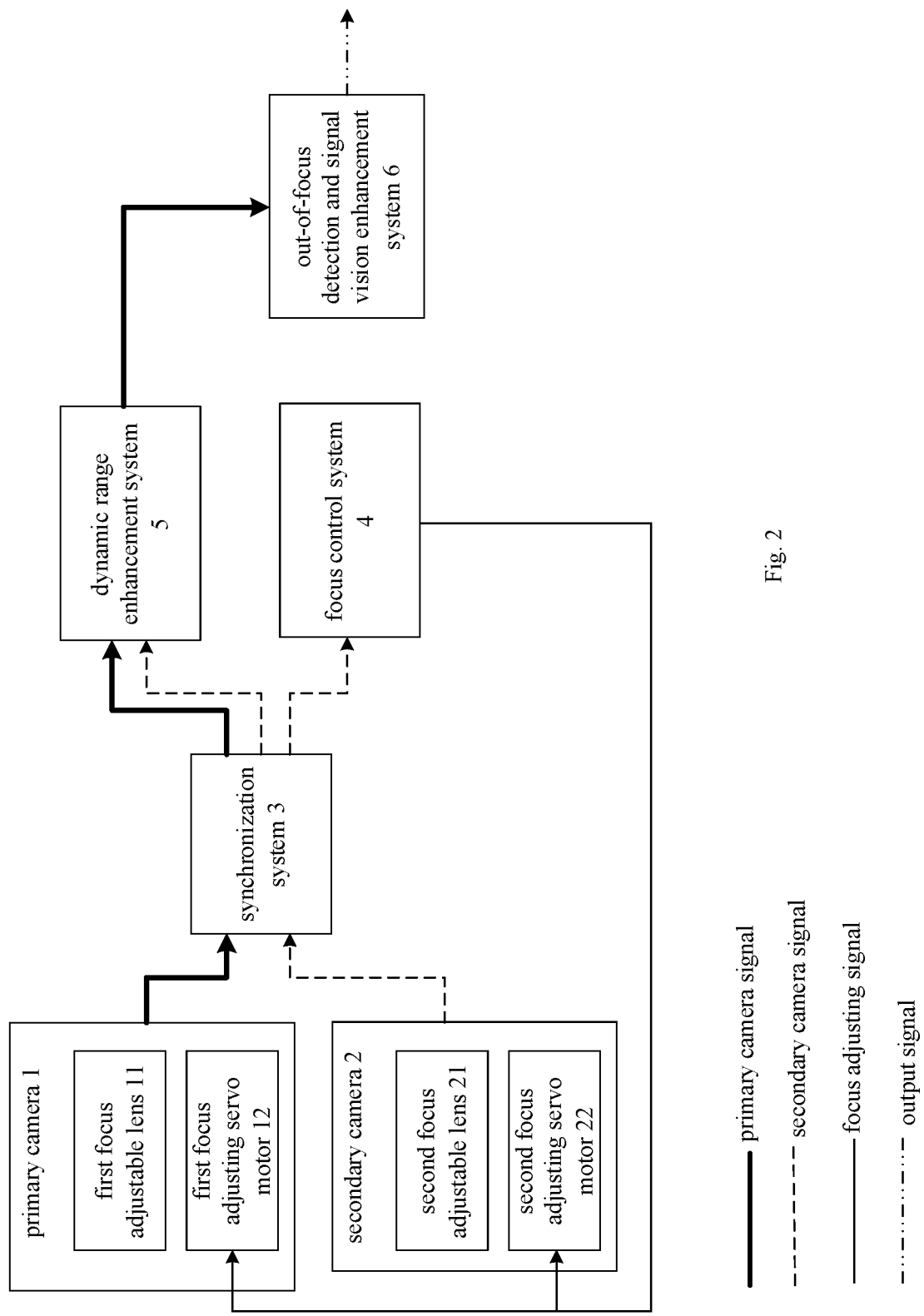
FIG. 2 is another schematic block diagram of the focus tracking system according to an embodiment of the present disclosure.

FIG. 2 is another schematic block diagram of the focus tracking system according to an embodiment of the present disclosure. As shown in FIG. 2, the focus tracking system further comprises a dynamic range enhancement system 5, which is configured for: firstly, mapping the frame-level synchronized secondary camera images onto the frame-level synchronized primary camera images, that is, a video signal from the secondary camera might have a lower resolution than a video signal from the primary camera, but as the primary camera and the secondary camera share the same shutter speed and the optical axes of the primary camera and the secondary camera are parallel, so an optical algorithm can be used to map the secondary camera images onto the primary camera images; calculating the color difference between the frame-level synchronized secondary camera images and the frame-level synchronized primary camera images based on mapping result, thereby obtaining color correction parameters; then performing color correction on the frame-level synchronized secondary camera images based on the color difference to obtain color-corrected frame-level synchronized secondary camera images consistent with the color response of the primary camera 1, the reason for performing the color correction is that, in the present disclosure, the secondary camera 2 is used for enhancing the signal of the primary camera 1, but there may be differences in the color response between the two cameras, and therefore, before the dynamic range enhancement, the color signal of the secondary camera 2 needs to suffer color correction to form a color signal consistent with the response of the primary camera 1; and then using a light intensity signal in the color-corrected frame-level synchronized secondary camera images to enhance the dynamic range of the frame-level synchronized primary camera images.

In the case of a large aperture value is set, the amount of light entering the camera decreases, the picture becomes darker, and the dynamic range decreases. Therefore, the decrease in dynamic range caused by the increase in the aperture value can be compensated back through the above-mentioned dynamic range enhancement solution, so that in the case of utilizing the large aperture value to increase the depth-of-field distance, the dynamic range enhancement is configured to compensate for the quality lost by adjusting the aperture.

Continuing to refer to FIG. 2, the focus tracking system according to the embodiment of the present disclosure can further comprise a out-of-focus detection and signal vision enhancement system 6, which is configured to: detect the out-of-focus area of the dynamic range-enhanced frame-level synchronized primary camera images, and generate a corresponding mask, wherein a deep learning algorithm can be used for detection; divide the dynamic range-enhanced frame-level synchronized primary camera images into a plurality of regions based on the mask, for example, divide the dynamic range-enhanced frame-level synchronized primary camera images into a plurality of regions based on the mask according to whether the images are out-of-focus or not; enhance the visual experience of the plurality of regions by utilizing signal vision enhancement algorithm, for example, a generative adversarial network (GAN); and reassemble the plurality of vision-enhanced regions into an output signal with the same specifications as the dynamic range-enhanced frame-level synchronized primary camera images.

According to the above-mentioned technical solution, the image quality of the out-of-focus part can be improved through signal vision enhancement, so that the overall image becomes clear.

Figure 3:
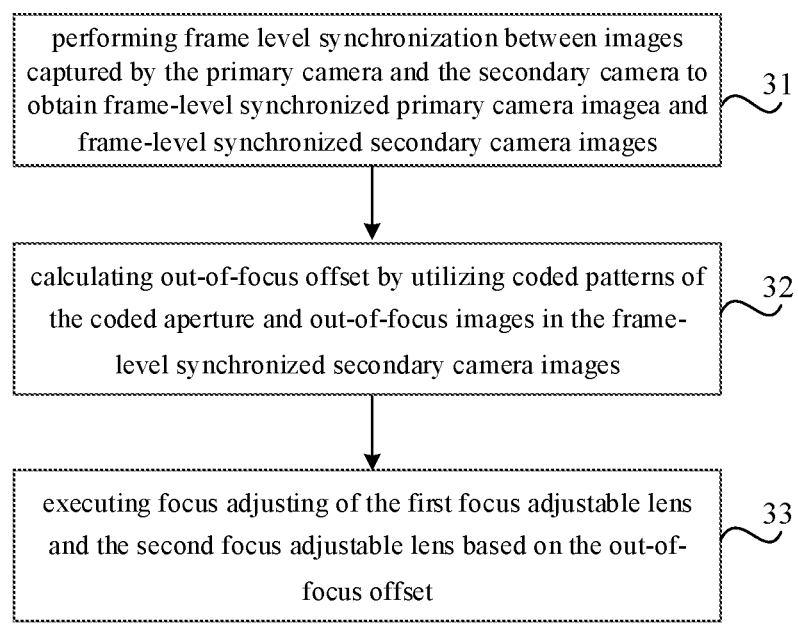
FIG. 3 is a flowchart of a focus tracking method according to an embodiment of the present disclosure.

FIG. 3 is a flowchart of a focus tracking method according to an embodiment of the present disclosure. The focus tracking method is applied to the focus tracking system. The focus tracking system comprises a primary camera 1, a secondary camera 2, a synchronization system 3, and a focus control system 4, wherein the primary camera 1 comprises a first focus adjustable lens 11 and a first focus adjusting servo motor 12, the first focus adjusting servo motor 12 is configured to control the first focus adjustable lens 11 to perform focus adjusting; the secondary camera 2 comprises a second focus adjustable lens 21 and a second focus adjusting servo motor 22, the second focus adjusting servo motor 22 is configured to control the second focus adjustable lens 21 to perform focus adjusting; a coded aperture is installed inside the second focus adjustable lens 21; and the secondary camera 2 has optical parameters equivalent to those of the primary camera 1. The focus tracking method comprises:

in step S31, performing frame level synchronization between images captured by the primary camera and the secondary camera to obtain frame-level synchronized primary camera images and frame-level synchronized secondary camera images;

in step S32, calculating out-of-focus offset by utilizing coded patterns of the coded aperture and out-of-focus images in the frame-level synchronized secondary camera images; and in step S33, executing focus adjusting of the first focus adjustable lens 11 and the second focus adjustable lens 21 based on the out-of-focus offset.

According to the above technical solution, the frame level synchronization between the images captured by the primary camera and the secondary camera can be performed, the coded patterns of the coded aperture installed inside the second focus adjustable lens and the out-of-focus images in the frame-level synchronized secondary camera images are used to calculate out-of-focus offset, and the focus adjusting of the first focus adjustable lens and the second focus adjustable lens are executed based on the out-of-focus offset, therefore, the precise zooming and focus adjusting can be achieved, and the final captured image is clear.

Optionally, the optical parameters comprise a dynamic range, a focus range, an aperture range, an exposure level, a zoom range and a shutter speed.

Optionally, the performing frame level synchronization between images captured by the primary camera and the secondary camera, comprising: at least one of a genlock mechanism, a master-slave control mechanism, a time stamp mechanism, and a audio synchronization mechanism is used to perform the frame level synchronization between images captured by the primary camera and the secondary camera.

Optionally, the calculating out-of-focus offset by utilizing coded patterns of the coded aperture and out-of-focus images in the frame-level synchronized secondary camera images, comprising: calculating the out-of-focus offset using a deconvolutional algorithm based on the coded patterns of the coded aperture and the out-of-focus images in the frame-level synchronized secondary camera images.

Optionally, the focus tracking method further comprises: mapping the frame-level synchronized secondary camera images onto the frame-level synchronized primary camera images; calculating the color difference between the frame-level synchronized secondary camera images and the frame-level synchronized primary camera images based on the mapping result; performing color correction on the frame-level synchronized secondary camera images based on the color difference to obtain the color-corrected frame-level synchronized secondary camera images consistent with the color response of the primary camera; and enhancing dynamic range of the frame-level synchronized primary camera images using light intensity signal in the color-corrected frame-level synchronized secondary camera images.

Optionally, the focus tracking method further comprises: detecting out-of-focus area of the dynamic range-enhanced frame-level synchronized primary camera images, and generating a corresponding mask; dividing the dynamic range-enhanced frame-level synchronized primary camera images into a plurality of regions based on the mask; utilizing signal vision enhancement algorithm to enhance visual experience of the plurality of regions; and reassembling the plurality of vision-enhanced regions into an output signal with the same specifications as the dynamic range-enhanced frame-level synchronized primary camera images.

Optionally, the signal vision enhancement algorithm is generative adversarial network.

The specific implementation of the operations performed in each step of the focus tracking method according to the embodiment of the present disclosure is described in detail in the relevant focus tracking system, and is not be repeated here.

The preferred embodiments of the present disclosure are described in detail above with reference to the drawings. However, the present disclosure is not limited to the specific details in the above-mentioned embodiments. Within the scope of the technical concept of the present disclosure, various simple modifications can be made to the technical solutions of the present disclosure. These simple modifications all belong to the protection scope of the present disclosure.

In addition, it should be noted that the various specific technical features described in the above-mentioned specific embodiments can be combined in any suitable manner in the case of no contradiction. In order to avoid unnecessary repetition, various possible combinations are not described separately in the present disclosure.

In addition, various different embodiments of the present disclosure can also be combined arbitrarily, as long as they do not violate the idea of the present disclosure, they should also be regarded as the content disclosed in the present disclosure.

The invention claimed is:

1. A focus tracking system, wherein, the focus tracking system comprises a primary camera, a secondary camera, a synchronization system and a focus control system, wherein:
the primary camera comprises a first focus adjustable lens and a first focus adjusting servo motor, and the first focus adjusting servo motor is configured to drive the first focus adjustable lens to perform focus adjusting;
the secondary camera comprises a second focus adjustable lens and a second focus adjusting servo motor, the second focus adjusting servo motor is configured to drive the second focus adjustable lens to perform focus adjusting, an coded aperture is installed inside the second focus adjustable lens, and the secondary camera has optical parameters equivalent to those of the primary camera;
the synchronization system is configured to perform frame level synchronization between images captured by the primary camera and the secondary camera to obtain frame-level synchronized primary camera images and frame-level synchronized secondary camera images; and
the focus control system is configured to calculate out-of-focus offset by utilizing coded patterns of the coded aperture and out-of-focus images in the frame-level synchronized secondary camera images, and to send focus adjusting signals to the first focus adjusting servo motor and the second focus adjusting servo motor based on the out-of-focus offset.

2. The focus tracking system of claim 1, wherein the optical parameters comprise a dynamic range, a focus range, an aperture range, an exposure level, a zoom range and a shutter speed.

3. The focus tracking system of claim 1, wherein the secondary camera is installed on the primary camera or adjacent to the primary camera, the optical axis of the secondary camera is parallel to the optical axis of the primary camera, and the focus plane of the secondary camera is as close as possible to the focus plane of the primary camera.

4. The focus tracking system of claim 1, wherein the synchronization system performs the frame level synchronization between images captured by the primary camera and the secondary camera by utilizing at least one of a genlock mechanism, a master-slave control mechanism, a time stamp mechanism, and an audio synchronization mechanism.

5. The focus tracking system of claim 1, wherein the focus control system calculates the out-of-focus offset using a deconvolutional algorithm based on the coded patterns of the coded aperture and the out-of-focus images in the frame-level synchronized secondary camera images.

6. The focus tracking system of claim 1, wherein the focus tracking system further comprises a dynamic range enhancement system, which is configured to:
map the frame-level synchronized secondary camera images onto the frame-level synchronized primary camera images;
calculate the color difference between the frame-level synchronized secondary camera images and the frame-level synchronized primary camera images based on mapping result;

perform color correction on the frame-level synchronized secondary camera images based on the color difference to obtain a color-corrected frame-level synchronized secondary camera images consistent with the color response of the primary camera; and enhance dynamic range of the frame-level synchronized primary camera images using light intensity signal in the color-corrected frame-level synchronized secondary camera images.

7. The focus tracking system of claim 6, wherein the focus tracking system further comprises a out-of-focus detection and signal vision enhancement system, which is configured to:

detect out-of-focus area of the dynamic range-enhanced frame-level synchronized primary camera images, and generate corresponding mask;

divide the dynamic range-enhanced frame-level synchronized primary camera images into a plurality of regions based on the mask;

enhance visual experience of the plurality of regions utilizing signal vision enhancement algorithm; and reassemble the plurality of vision-enhanced regions into output signal with the same specifications as the dynamic range-enhanced frame-level synchronized primary camera images.

8. The focus tracking system of claim 7, wherein the signal vision enhancement algorithm is generative adversarial network.

9. The focus tracking system of claim 1, wherein the focus control system is further configured to acquire focus distance of the first focus adjustable lens in the case of manually focusing the first focus adjustable lens, and to send the focus distance of the first focus adjustable lens to the second focus adjusting servo motor.

10. A focus tracking method, applied to a focus tracking system, wherein, the focus tracking system comprises a primary camera, a secondary camera, a synchronization system, and a focus control system, the primary camera comprises a first focus adjustable lens and a first focus adjusting servo motor, the first focus adjusting servo motor is configured to drive the first focus adjustable lens to perform focus adjusting, the secondary camera comprises a second focus adjustable lens and a second focus adjusting servo motor, the second focus adjusting servo motor is configured to drive the second focus adjustable lens to perform focus adjusting, coded aperture is installed inside the second focus adjustable lens, and the secondary camera has optical parameters equivalent to those of the primary camera; and the method comprises:

performing frame level synchronization between images captured by the primary camera and the secondary camera to obtain frame-level synchronized primary camera images and frame-level synchronized secondary camera images;

calculating out-of-focus offset by utilizing coded patterns of the coded aperture and out-of-focus images in the frame-level synchronized secondary camera images; and executing focus adjusting of the first focus adjustable lens and the second focus adjustable lens based on the out-of-focus offset.

11. The focus tracking method of claim 10, wherein the optical parameters comprise a dynamic range, a focus range, an aperture range, an exposure level, a zoom range and a shutter speed.

12. The focus tracking method of claim 10, wherein the secondary camera is installed on the primary camera or adjacent to the primary camera, the optical axis of the secondary camera is parallel to the optical axis of the primary camera, and the focus plane of the secondary camera is as close as possible to the focus plane of the primary camera.

13. The focus tracking method of claim 10, wherein the performing frame level synchronization between images captured by the primary camera and the secondary camera, comprises:

performing the frame level synchronization between images captured by the primary camera and the secondary camera by utilizing at least one of a genlock mechanism, a master-slave control mechanism, a time stamp mechanism, and an audio synchronization mechanism.

14. The focus tracking method of claim 10, wherein the calculating out-of-focus offset by utilizing coded patterns of the coded aperture and out-of-focus images in the frame-level synchronized secondary camera images comprises:

calculating the out-of-focus offset using a deconvolutional algorithm based on the coded patterns of the coded aperture and the out-of-focus images in the frame-level synchronized secondary camera images.

15. The focus tracking method of claim 10, wherein the focus tracking method further comprises:

mapping the frame-level synchronized secondary camera images onto the frame-level synchronized primary camera images;

calculating the color difference between the frame-level synchronized secondary camera images and the frame-level synchronized primary camera images based on mapping result;

performing color correction on the frame-level synchronized secondary camera images based on the color difference to obtain a color-corrected frame-level synchronized secondary camera images consistent with the color response of the primary camera; and enhancing dynamic range of the frame-level synchronized primary camera images using light intensity signal in the color-corrected frame-level synchronized secondary camera images.

16. The focus tracking method of claim 15, wherein the focus tracking method further comprises:

detecting out-of-focus area of the dynamic range-enhanced frame-level synchronized primary camera images, and generate corresponding mask;

dividing the dynamic range-enhanced frame-level synchronized primary camera images into a plurality of regions based on the mask;

enhancing visual experience of the plurality of regions utilizing signal vision enhancement algorithm; and reassembling the plurality of vision-enhanced regions into output signal with the same specifications as the dynamic range-enhanced frame-level synchronized primary camera images.

17. The focus tracking method of claim 16, wherein the signal vision enhancement algorithm is generative adversarial network.

18. The focus tracking method of claim 10, wherein the focus control method further comprises:

acquiring focus distance of the first focus adjustable lens in the case of manually focusing the first focus adjustable lens; and sending the focus distance of the first focus adjustable lens to the second focus adjusting servo motor.

* * * * *

UNITED STATES PATENT AND TRADEMARK OFFICE
CERTIFICATE OF CORRECTION

PATENT NO. : 11,265,486 B2
APPLICATION NO. : 17/317099
DATED : March 1, 2022
INVENTOR(S) : Han et al.

It is certified that error appears in the above-identified patent and that said Letters Patent is hereby corrected as shown below:

In the Drawings

In Sheet 3 of 3, FIG. 3, for Tag "31" Line 3, delete "imagea" and insert -- images --, therefor.

In the Specification

In Column 2, Line 18, delete "utilize" and insert -- utilizing --, therefor.

In Column 3, Line 35, delete "use the" and insert -- uses the --, therefor.

In Column 5, Line 7, delete "patterns appears" and insert -- patterns appear --, therefor.

In Column 7, Line 10, delete "a audio" and insert -- an audio --, therefor.

In the Claims

In Column 8, Line 18, Claim 1, delete "an coded" and insert -- a coded --, therefor.

In Column 9, Line 11, Claim 7, delete "a out-of-focus" and insert -- an out-of-focus --, therefor.

Signed and Sealed this
Twenty-second Day of November, 2022

Katherine Kelly Vidal
*Director of the United States Patent and Trademark Office*